United States Patent
Paxton et al.

[11] 3,910,811
[45] Oct. 7, 1975

[54] METHOD AND MACHINE FOR REMOVEABLY SECURING STIFF PLASTIC CLOSURES FLAT AGAINST SERIES OF MOVING PACKAGES

[75] Inventors: Jerre H. Paxton, Yakima; Jack H. Holmes, Cowichi, both of Wash.

[73] Assignee: Kwik Lok Corporation, Yakima, Wash.

[22] Filed: July 18, 1974

[21] Appl. No.: 489,471

[52] U.S. Cl. .................. 156/521; 53/128; 83/622; 83/683; 83/917
[51] Int. Cl.² ........................................ B32B 31/00
[58] Field of Search .......... 156/521, 264, 265, 285; 83/622, 683, 695, 917; 53/14, 41, 133, 128, 137, 138 A, 296

[56] References Cited
UNITED STATES PATENTS

| | | | |
|---|---|---|---|
| 2,107,311 | 2/1938 | Strickler | 156/521 X |
| 2,694,964 | 11/1954 | Smith | 53/133 X |
| 3,163,972 | 1/1965 | Irwin | 53/138 A |
| 3,300,363 | 1/1967 | Burroughs | 156/521 |
| 3,334,550 | 8/1967 | Craig | 156/264 X |
| 3,583,125 | 6/1971 | Vermeulen | 53/133 X |
| 3,698,551 | 10/1972 | Tomlinson | 53/14 X |

Primary Examiner—Donald R. Schran
Assistant Examiner—Horace M. Culver
Attorney, Agent, or Firm—Dana E. Keech

[57] ABSTRACT

A mandrel rotated step-by-step while spaced upwardly from a series of loaded flexible plastic bags travelling therebeneath on a conveyor, a tape adhesively surfaced on its out-turned face being trained onto said mandrel and vacuum held thereagainst, said tape being then divided transversely into strips and an individual stiff plastic bag closure applied to the exposed adhesive of each strip, each such strip-closure unit being thus formed and delivered in upwardly spaced relation with one of said travelling loaded bags and then air blasted into adhesive engagement with said bag.

Incidental to forming said plastic adhesive strips on said mandrel, a pair of opposed short slits are cut in opposite side edges of each strip to facilitate removal of the closure united with said strip from the bag it is applied to.

4 Claims, 17 Drawing Figures

METHOD AND MACHINE FOR REMOVEABLY SECURING STIFF PLASTIC CLOSURES FLAT AGAINST SERIES OF MOVING PACKAGES

SUMMARY OF THE INVENTION

This invention has as its principal object the provision of a method and machine for automatically producing a recloseable loose product loaded package invented by Jerre H. Paxton and disclosed and claimed in his copending application Ser. No. 436,665 filed Jan. 25, 1974.

The preferred form of said package includes, basically, a flexible polyethylene bag about 1 foot long by 5 inches wide, sealed at its opposite ends incidental to its being formed and filled with a loose, dry granular product, for example: beans or short macaroni. The production of the basic package is performed by a conventional form-fill-seal packaging machine from which the packages are delivered serially onto a belt conveyor.

The recloseable bag also includes a sheet plastic bag closure of the "Kwik Lok" type, access to an internal bag neck confining aperture in which is provided by a narrow slot in one edge of the closure.

The reclosure is placed flat against the loaded bag and removably retained in place by a strip of plastic adhesive tape overlying the reclosure and with its ends pressed down against the bag. To prevent the bag being torn in removing the closure, a pair of aligned short slits are formed in opposite sides of the adhesive strip close to one side of the reclosure. The reclosure is thus securely fastened to the bag but releasable therefrom with ease when the time comes to apply the reclosure to the bag to reclose the same after its initial opening.

Another object of the present invention is to provide a machine which can be readily juxtaposed in overlying relation with the aforementioned conveyor and the loaded bags travelling thereon, and which is operative to apply to each such bag a reclosure and an adhesive strip removably holding the same to said bag.

A further object is to provide such a machine which will provide a pair of opposed slits in the side edges of each of said adhesive strips before applying the same to a loaded bag for securing a reclosure thereto.

DETAILED DESCRIPTION OF THE PREFERRED EMBODIMENT

A continuously travelling approximately horizontal flat endless belt conveyor 20 is employed for receiving a series of tubular polyethylene bags 21 loaded with a dry pourable granular product 22 and conveying the same away from a form-fill-seal machine (not shown) in which said loaded bags were formed, filled and provided thermally with seals 23 and 24 at their opposite ends.

Figures 2, 3:
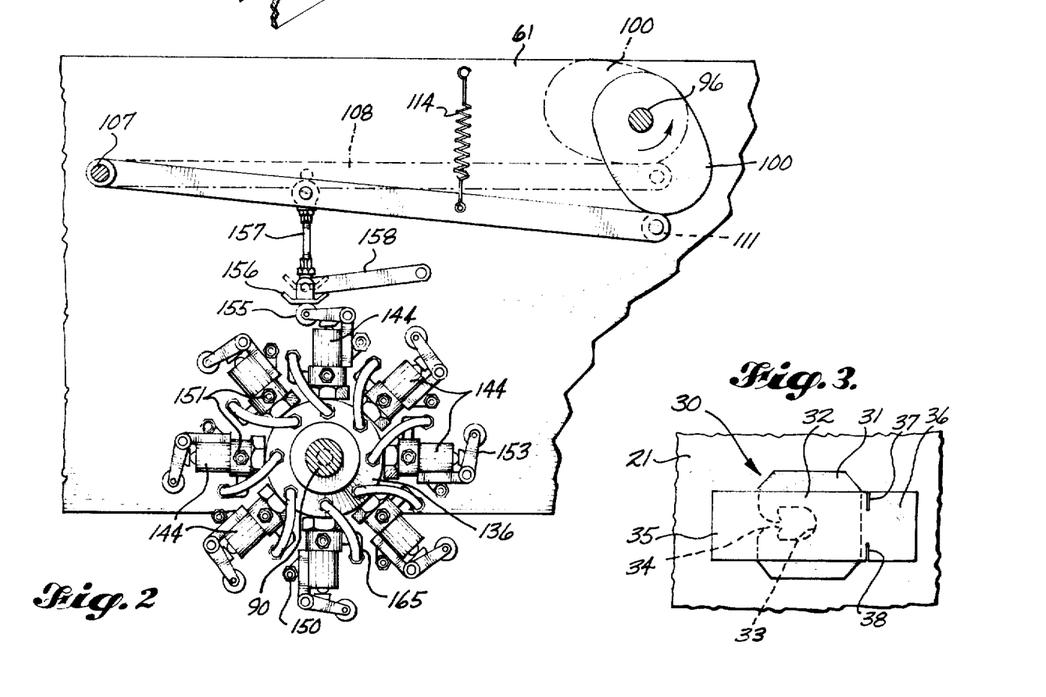
FIG. 2 is a diagrammatic fragmentary vertical sectional view illustrating the operation of the valves of the reclosure applying mandrel and taken on the line 2—2 of FIG. 4.
FIG. 3 is a plan view of a reclosure and adhesive strip unit as formed, assembled, and air blasted onto a loaded bag.

Mounted on parallel base beams 25 which extend under the conveyor 20 and from which posts 26 extend upwardly to be united by a cross member 27 at their upper ends, is a machine 28. This machine has the object of automatically producing and applying to each of the bags 21 travelling therebeneath on said conveyor, a reclosure unit 30 as shown in FIG. 3. This unit comprises a Kwik Lok type sheet plastic bag closure 31 and an adhesively coated strip of tape 32 overlying and adhering to said closure and to said bag so as to removably secure the closure to the bag. The closure incorporates an internal bag neck enclosing aperture 33 access to which is had through an edge opening 34. The adhesive strip 32 provides end tabs 35 and 36 for sticking the unit 30 to a bag 21. In producing the unit 30, the machine 28 cuts short aligned slits 37 and 38 in opposite side edges of tab 36 to assist in removal of the closure 31 from bag 21 after the latter has been opened and the closure is needed to reclose the same.

Figure 1:
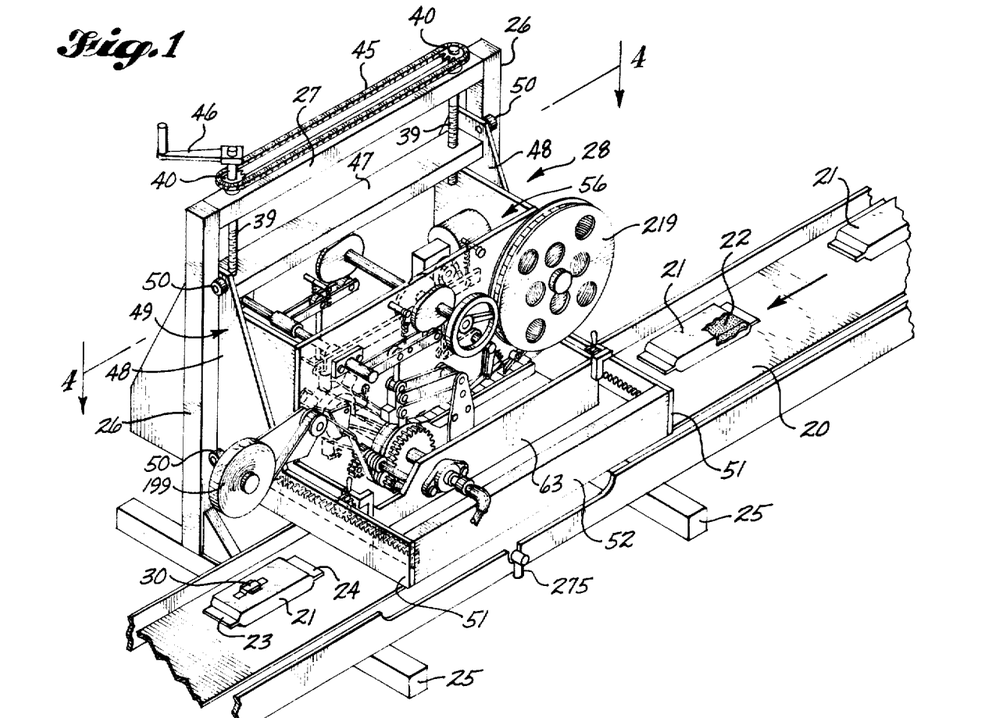
FIG. 1 is a perspective view of a preferred embodiment of the machine of the invention.

The machine 28, as shown in FIG. 1, includes a pair of threaded shafts 39 having sprockets 40 at their upper ends connected by an endless chain 45. Said shafts rotate freely in holes provided in cross beam 27, said sprockets bearing on said beam and one of shafts 39 having fixed thereto a crank handle 46. Threaded shafts 39 screw downwardly in tapped holes provided in an elevator beam 47, opposite ends of which are attached to upper ends of side plates 48 of an elevator frame 49. This frame is guided vertically on posts 26 by rollers 50 mounted on plates 48.

Narrow lower portions 51 of side plates 48 extend forwardly over conveyor 20 and are there connected by a front channel member 52. Rear edges of side plates 48 are joined by a rear channel member 53. Rack tracks 54 are fixed horizontally on inside faces of side plates 48, including forward extensions 51 thereof. A tandem spaced pair of gears 55 mesh with and roll on each of tracks 54 to adjustably support a box structure 56 including side plates 59 and 60 on which said gears are rotatably mounted. Side plates 59 and 60 are joined by rear and middle high plates 61 and 62 and a low front plate 63. Front corners of box structure 56 have mounted thereon manually releasable gear latches 64 which releasably lock gears 55 against rotation thus affording manual control of the position in which box structure 56 is supported on tracks 54, with regard to the degree of its extension forwardly over the conveyor 20 (See FIG. 4).

Most of the operative elements of the machine 28 are mounted on the box structure 56. These include a constant speed motor 65 which is supported on a horizontal plate 66 secured to plates 59 and 61 (See FIG. 4). Journalled in suitable bearings provided on the bottom of plate 66 is a counter shaft 67 carrying sprockets 68 and 69 and a single revolution clutch 70 which is controlled by a solenoid 75. The motor 65 has an output sprocket 76 which rotates counter clockwise and which is connected by an endless chain 77 to the clutch 70.

Supported on plate 66 and side plate 61 is a geneva drive 78 having an input shaft 79 on which is mounted a completely disengagable safety clutch 80 which is connected by an endless chain 81 to sprocket 68. The geneva drive 78 has an output shaft 82, carrying a sprocket 83, which shaft rotates clockwise.

Journalled in suitable bearings 84 and 85 provided on box side plates 61 and 63 is the shaft 90 of a reclosure unit assembly and delivery device 91. Provided on a rear end portion of shaft 90 is a sprocket 92 which is aligned with geneva output sprocket 83 and connected therewith in a one-to-one drive relation by an endless chain 93.

Journalled in bearings 94 and 95 fixed respectively on box structure side plates 61 and 62 is a cam shaft 96 on the rear end of which is fixed a drive sprocket 97 and on the front end of which is fixed a hand wheel 98. Sprocket 97 is aligned with sprocket 69 and connected therewith by an endless chain 99 to establish a one-to-one drive ratio between counter shaft 67 and cam shaft 96. The output shaft 82 of geneva drive 78 however, is only intermittently rotated a one-eighth turn for each rotation of counter shaft 67 and this takes place during the final 135° of said rotation. The connection through chain 93 with shaft 90 causes the latter to also rotate a one-eighth turn during each one-eighth rotation of output shaft 82.

Fixed on cam shaft 96 is a valve actuating cam 100, a closure pick cam 105 and a closure break-off and adhesive strip cutting cam 106. Fixed on plates 61 and 62 is an arm pivot shaft 107. Pivoted on shaft 107 are bar arms 108, 109 and 110, which arms carry respectively cam responsive rollers 111, 112 and 113 which are biased to contact and follow the peripheries of cams 100, 105 and 106 by coil springs 114.

Journaled in suitable bearings provided in plates 61 and 62 is a rocker shaft 115. Fixed to the front end of said shaft and extending downwardly therefrom is an arm 120. Also fixed to said shaft and extending approximately horizontally therefrom is an arm 121, the latter being in vertical alignment with bar arm 109 and connected therewith by a turnbuckle link 122.

Referring now to FIGS. 2 to 16 inclusive, the reclosure unit assembly and delivery device 91 is constructed as follows: The shaft 90 of this device is provided at its rear end with an axial bore 123 which connects at the shaft end through a freely rotatable coupling 124 and a pipe 125 with a vacuum pump (not shown). Radial holes 126 formed in the shaft 90 connect with the inner end of bore 123. The forward end portion of shaft 90 has an axial bore 127 and a rotatable coupling 128 and pipe 129 connects bore 127 with a compressed air pump (not shown). Radial holes 130 formed in the shaft 90 communicate with the inner end of bore 127.

Figure 15:
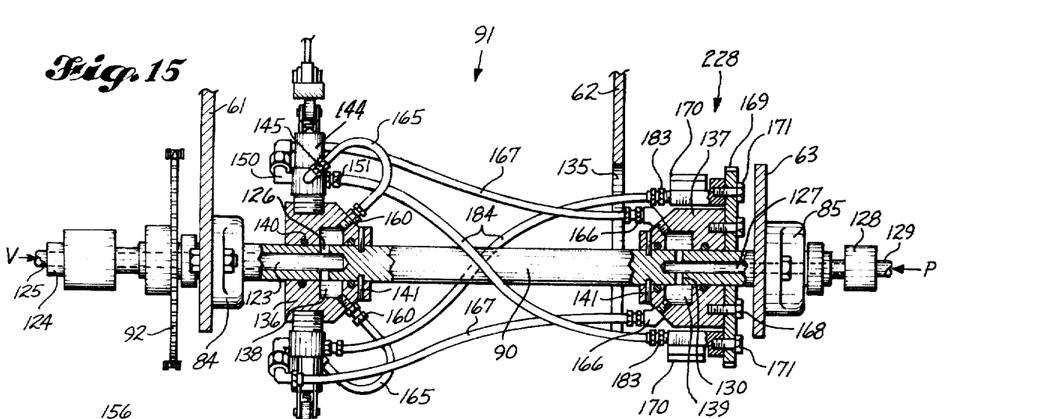
FIG. 15 is an enlarged diagrammatic vertical sectional view taken on the line 15—15 of FIG. 4 and illustrating the mechanism for automatically imposing a vacuum upon or delivering compressed air to each of said mandrel assembly platforms as required in the operation of assemblying closure-adhesive strip units and blasting each unit downwardly into adhering relation with a loaded package being conveyed therebeneath.

The lower edge of box structure plate 62 is provided with a deep recess 135 formed upwardly therein to accommodate the device 91. Vacuum and compressed air manifolds 136 and 137, each of which comprises a cylindrical block beveled at one end and having axial bores into which the shaft 90 slideably fits and which are provided respectively with annular chambers 138 and 139, are fixed on shaft 90 in spaced relation as shown in FIG. 15 so that the chambers 138 and 139 of said manifolds communicate respectively through radial holes 126 and 130 with the vacuum and compressed air bores 123 and 127. Suitable packing, such as O-rings 140, are provided in manifolds 136 and 137 to form seals between said manifolds and shaft 90 on opposite sides of said chambers 138 and 139. Suitable means, such as radial set pins 141, are provided in manifolds 136 and 137 for setting said manifolds on shaft 90 as shown in FIG. 15.

Eight shallow tapped holes 142 are provided in the periphery of vacuum manifold 136 into which threaded studs 143 of a series of eight three-way control valves 144 are screwed. Each of valves 144 is provided with a vacuum fitting 145, a compressed air fitting 150 and an operational fitting 151. These fittings connect with three ports (not shown) within the valve which are interconnected by the actuation of a upwardly spring biased valve stem 152 by a rocker arm 153 which is pivotally mounted on an arm 154 fixed on the body of said valve. Each arm 153 has a roller 155 rotatably mounted on its free end which is adapted to be engaged by a horizontal plate 156 which is fixed on the lower end of a turnbuckle link 157, the upper end of which pivotally connects to bar arm 108 and the lower end of which is vertically guided by a link 158 which is pivotally mounted on a horizontal stud 159 extending forwardly from box structure wall 61.

The vacuum manifold 136 is also provided with a series of eight vacuum fittings 160 which connect with vacuum chamber 138 and in turn are connected respectively to the vacuum fittings 145 of control valves 144 by short flexible plastic tubes 165.

The compressed air manifold 137 has a series of eight compressed air fittings 166 which are mounted on the tapered portion of said manifold and communicate with the compressed air chamber 139 thereof. The fittings 166 are connected respectively by plastic tubes 167 with the compressed air fittings 150 of the several valves 144.

Slideably received on the front end of shaft 90 inside the plate 63 and secured by screws 168 to the front face of compressed air manifold 137 is a master gear 169. Referring now to FIGS. 6 to 14, a series of eight plastic strip-closure unit assembly platforms 170 are secured by screws 171 to a peripheral portion of master gear 169. Each platform 170 includes a base member 172 and a cap 173. The base member 172 comprises a rectangular block of metal having a pair of tapped holes 174 for receiving screws 171 and deeply milled away to provide a flat face 175 on which cap 173 rests, such cap being secured to said base member by four screws 180. A flat recess 181 is milled out of the face 175 of the base member 172, this recess communicating with a tapped hole 182 formed horizontally in the base member 172 for receiving an operational fitting 183. Operational fittings 183 are connected respectively with operational fittings 151 of valves 144 by plastic tubes 184, it being noted (see FIG. 15) that each valve 144 is thus connected by one of the plastic tubes 184 with the operational fitting 183 disposed at a diametrically opposite position relative thereto in the reclosure unit assembly and delivery device 91.

Figures 11, 14:
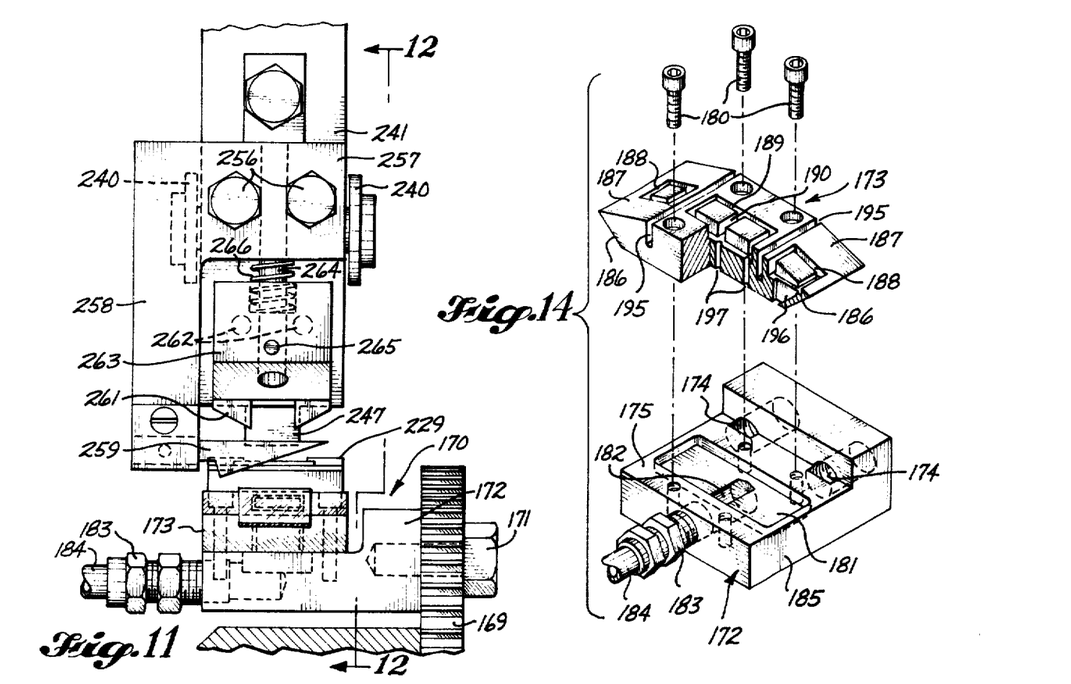
FIG. 11 is an enlarged sectional fragmentary detail view taken on the line 11—11 in FIG. 12, at the moment the mandrel halts after a one-eighth rotation with a particular assembly platform in zenith position and with the assembly ram poised upwardly at the instant it starts downward to form and assemble a tape-closure unit on said platform.
FIG. 14 is an exploded perspective view, partly broken away, of one of said mandrel assembly platforms.
Figure 12:
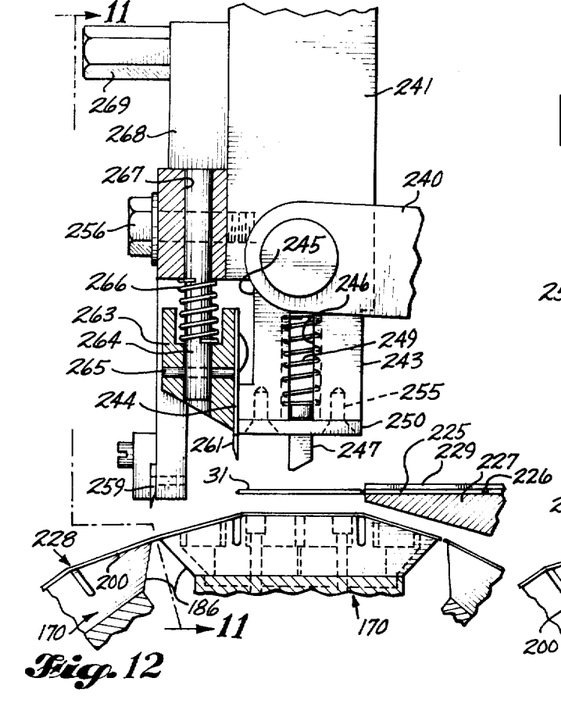
FIG. 12 is a sectional view taken on the line 12—12 of FIG. 11 showing how, at this moment, an end portion of the adhesive tape is vacuum held to the upper face of said assembly platform block (halted in zenith position) while an endmost closure of said closure ribbon has been delivered by the closure pick mechanism into centralized relation with an overlying said tape end portion.
Figure 13:
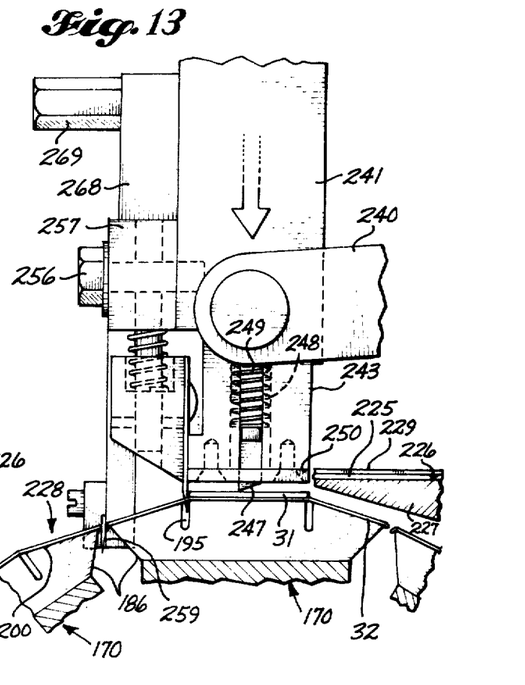
FIG. 13 is a view similar to FIG. 12 showing said assembly ram depressed to sever said end portion from said adhesive tape to form a unit adhesive strip; to slit opposed edges of said strip; to yieldably depress said endmost closure and then shear the same from said closure ribbon thereby snapping said closure downward into adhering relation with the upturned adhesive of said strip so as to complete the assembly of a closure-adhesive strip unit held by vacuum to the face of the assembly platform located at 12 o'clock on the mandrel.

As shown in FIG. 11, the cap 173 of each assembly platform 170 is substantially wider than the adhesive tape 32 employed in assembling strip closure units 30 on the machine 28. As clearly shown in FIG. 14, the juxtaposed side faces 185 of the base members 172 are spaced apart about one-half inch and the corresponding side faces 186 of assembly platform caps 173 are tapered so as to form an inverted V-shaped space between juxtaposed ends of said caps. Opposite end portions 187 of the top faces of said caps are beveled so that said beveled upper face portions of contiguous assembly platforms 170 are in alignment as shown in FIGS. 12 and 13.

Grooves 188 are routed in an approximately square pattern in said beveled end portions of the upper face of each cap 173 and a similar rectangular pattern 189 of grooves is routed from the upper flat face of each cap 173 located between said beveled faces. Each rectangular groove 189 is connected at a mid point therein by a cross groove 190. Cross grooves 195 are also milled in the upper surface of each cap 173 which extend between and do not connect with square grooves 188 and rectangular groove 189. The square grooves 188 and rectangular groove 189 overlie the flat recess 181 formed in base member 172 and are connected with said recess by holes 196 and 197 respectively formed in the cap 173 as shown in FIG. 14.

Mounted on the outer end of an arm 198 fixed to the left edge of box structure plate 62 is a spool 199 carrying a roll of adhesive tape 200 which unrolls counter clockwise and is trained over idle rollers 201 and 202 from which said tape extends downwardly into adhesive engagement with an adhesive tape feed mechanism 203.

Figures 8, 9, 10:
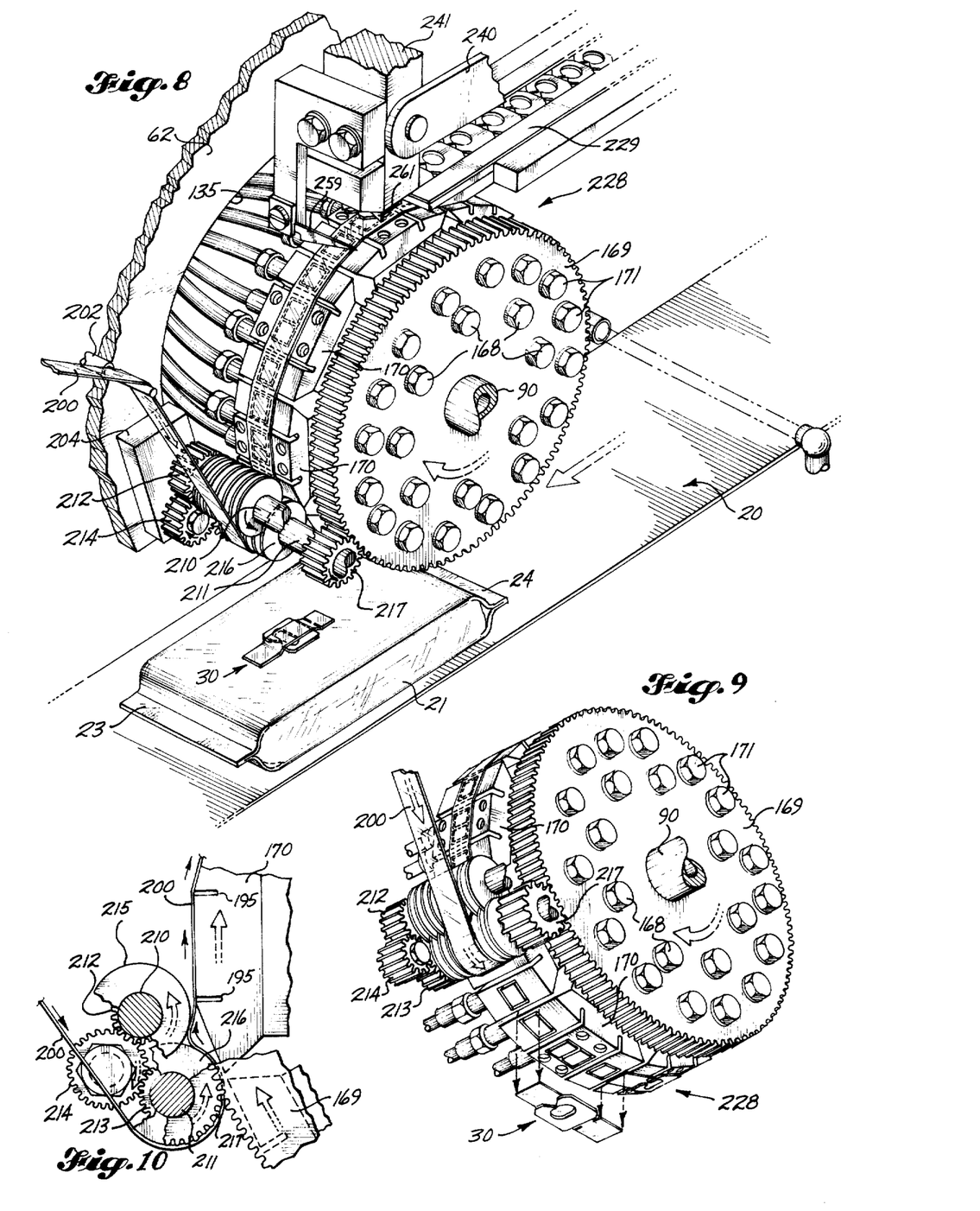
FIG. 8 is a fragmentary diagrammatic perspective view of said mandrel looking down thereon from above.
FIG. 9 is a view similar to FIG. 8 but looking upward at said mandrel from beneath as an adhesive strip-closure unit being air blasted downward therefrom for application to a loaded bag.
FIG. 10 is an enlarged fragmentary sectional view looking endwise at the adhesive tape feed rollers, the lower roller of which engages the sticky side of the tape to accurately feed the tape towards the unit assembly mandrel, the faster speed of the upper roller causing this to unstick the tape from the lower roller without itself becoming stuck fast to the tape whereby the tape responds to the suction of the mandrel and is held to the periphery thereof with the non-adhesive surface of the tape engaging the mandrel.

Tape feed 203 is mounted on bearing blocks 204 and 205 fixed on box structure plates 62 and 63 to rotatably support short shafts 210 and 211 on which are fixed gears 212 and 213, the first of which gears is slightly smaller than the second, both of said gears meshing with an idle gear 214 which is pivotally mounted on bearing block 204. Fixed on shafts 210 and 211 are rollers 215 and 216 each of which is made up of a series of closely spaced discs with the discs of the two rollers in intermeshing relation as shown in FIGS. 8, 9 and 10. The rollers 215 and 216 are juxtaposed close to and in radial alignment with the assembly platforms 170 mounted on master gear wheel 169. Fixed on shaft 211 and meshing with master gear wheel 169 is a driven pinion 217 which has approximately the same pitch diameter as the outside diameter of roller 216.

Owing to the difference in diameters between the gears 212 and 213, the upper roller 215 is driven by the master gear 169 at a slightly greater peripheral speed than that with which lower roller 216 is driven, the object of this being made clear in the description of the operation.

Pivotally mounted on a horizontal stud 218 at the opposite end of the machine 28 on box structure wall 62 is a reel 219 for holding a coil 220 of ribbon 225 embodying a series of closures 31 with each consecutive pair of closures held together by a pair of integral webs 226. The reel 219 is in radial alignment with the adhesive strip reel 199. Secured to and extending forwardly from the vertical wall plate 62 of the machine 28 is a closure strip feed track 227 which is located just below the lower end of arm 120 and extends from a position directly under reel 219 to a point just short of being directly over the center of the strip closure assembly mandrel 228 formed by the eight assembly platforms 170 mounted on gear 169. The track 227 has guide moldings 229 which overlie side edges of the closure ribbon 225 as this is fed along said track by a closure pick 230 pivotally mounted on the lower end of arm 120 and spring biased downwardly to bring its forward end into engagement with successive closures in said ribbon. A non-return check device 231 is mounted on plate 62 to overlie the closure ribbon 225 and be spring biased downwardly against said ribbon to prevent reverse travel of the ribbon when closure pick 230 is being retracted.

Supported on and extending upward from closure ribbon feed track 227 is a plate 232 which is connected by two horizontal idle shafts 233 and 234 to plate 62. Pivoted on said shafts are sleeves 235 having pairs of arms 240 integral therewith. With said pairs of arms parallel, their respective free ends receive therebetween and are pivoted to a break-off ram 241. The upper end of ram 241 is connected by a turnbuckle link 242 to bar arm 110 (See FIG. 5) so that the ram 241 is reciprocated vertically once during each machine cycle by cam 106.

The ram 241 preferably comprises a one and one-quarter inch square steel bar, the right lower corner of which is milled away to form vertical face 243, and the opposite lower face of which is milled away to form a vertical face 244 just above which a deeper recess 245 is milled. A transverse central slot 246 is formed vertically in the lower end of ram 241 to slideably receive a closure stripper plate 247. Holes 248 are also formed upwardly in ram 241 to receive coil springs 249 to spring bias said stripper plate downwardly. An apertured hardened face plate 250 is secured to the bottom end of ram 241 by four screws 255 to slideably surround and hold stripper plate 247 in place and to cooperate with the adjacent end of the closure ribbon feed track 227 to shear an endmost closure 31 from the closure ribbon 225 each time the ram 241 moves downwardly from the position in which it is shown in FIG. 12 to the position in which it is shown in FIG. 13.

Secured by two screws 256 to the ram 241 is a head 257 of an offset downward cutter supporting arm 258 having mounted on the lower end thereof a cantilever razor-sharp blade 259 which is in alignment with the inverted V-shaped space between the assembly platform 170 disposed in the zenith position on the reclosure unit assembly mandrel 228 and the immediately preceding platform 170 as shown in FIGS. 12 and 13. Also mounted on ram 241 is a razor-sharp tape edge slitting blade 261 which extends downwardly, with each lowering of the ram 241, into one of the grooves 195 formed in the cap 173 located in zenith position on the mandrel 228 as shown in FIG. 13 so as to cut the two slits 37 and 38 in the adhesive strip 32 severed from the adhesive tape 200 in the current operational cycle. The blade 261 is secured by two screws 262 to a block 263 which is vertically apertured to receive a rod 264 to which it is secured by a pin 265, said block being recessed to accommodate a coil spring 266, said rod extending upwardly slideably through a hole formed vertically in the head 257 of arm 258, the upper end of rod 264 terminating in a block 268 having a forwardly extending arm 269 and resting on the top of head 257 to limit downward movement of the tape edge slitting blade 261 while permitting said blade to yield upwardly if it meets with an excessive resistance in the tape slitting operation of any operating cycle of the machine.

Figure 4:
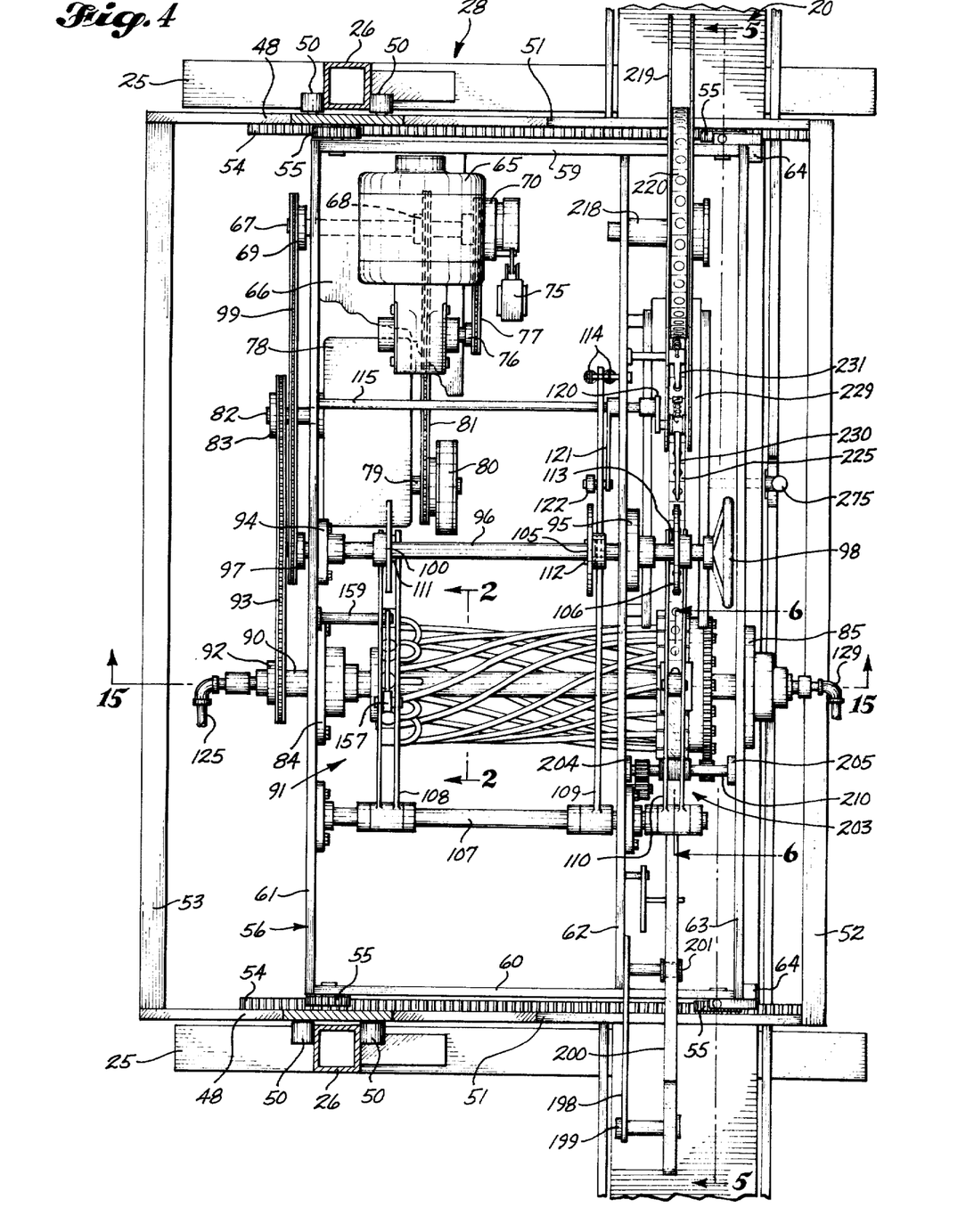
FIG. 4 is a sectional plan view of the machine of the invention taken on line 4—4 of FIG. 1.
Figure 5:
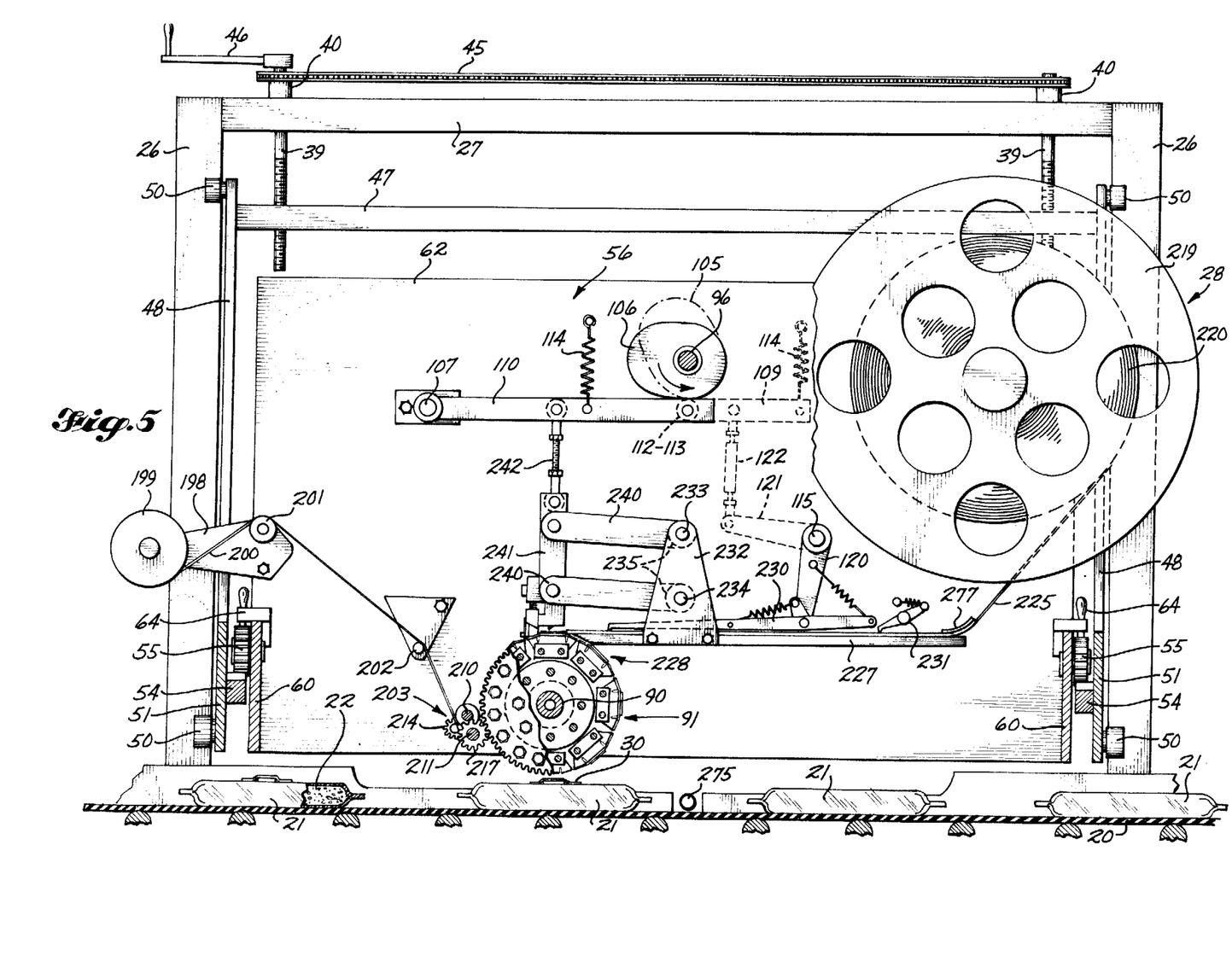
FIG. 5 is a vertical sectional view taken on the line 5—5 of FIG. 4, illustrating the cam mechanisms for feeding the closure ribbon, severing the endmost closure therefrom, severing an adhesive strip from the adhesive tape, cutting opposed slits in edges of said strip, and applying the severed closure to the exposed adhesive on said strip.
Figure 6:
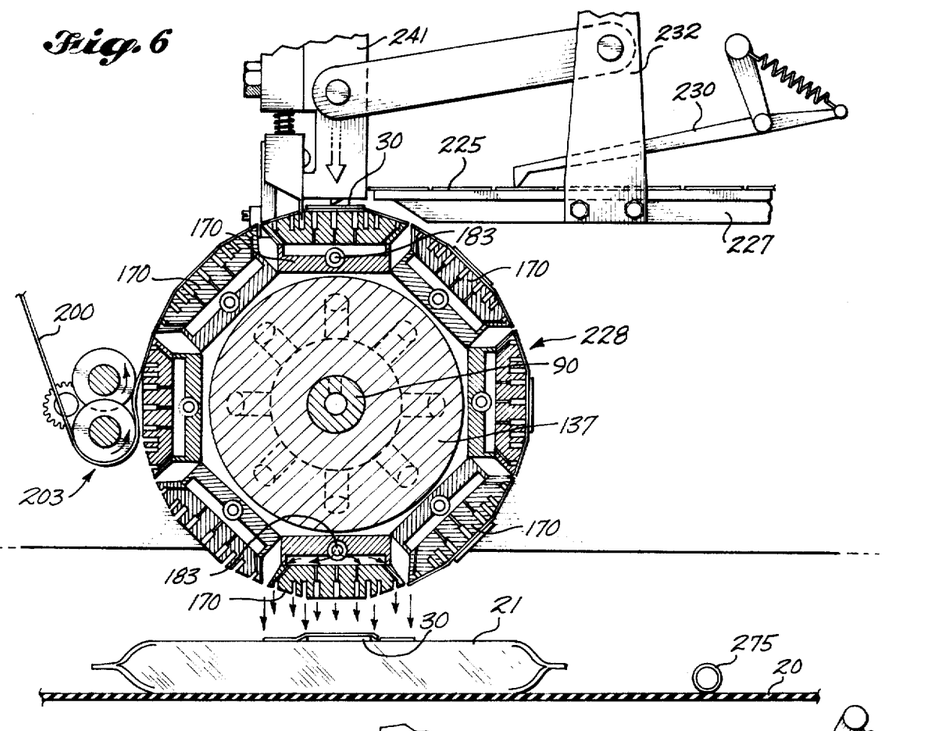
FIG. 6 is an enlarged diagrammatic vertical sectional view taken on line 6—6 of FIG. 4 for illustrating a pause in the rotation of the adhesive strip and closure assembly and delivery mandrel with a strip-closure unit being assembled at 12 o'clock on said mandrel, while another such unit is being air blasted downwardly at 6 o'clock from said mandrel onto a loaded bag travelling therebeneath.
Figure 7:
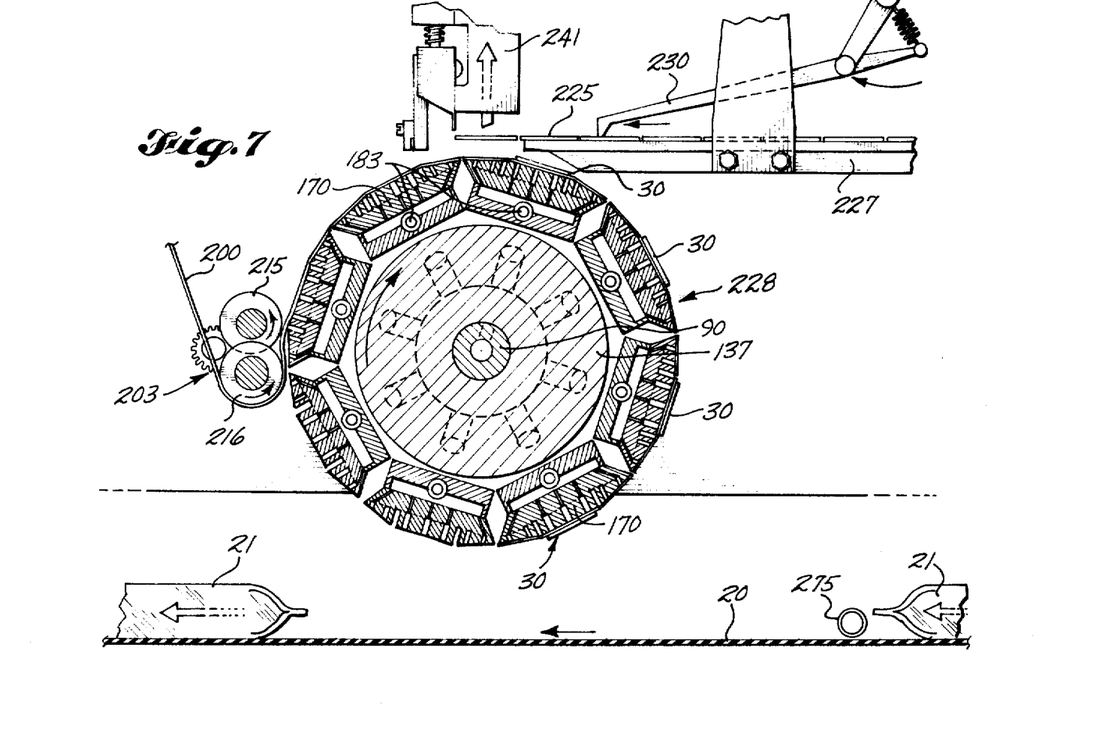
FIG. 7 is a view similar to FIG. 6 illustrating the ribbon cutting ram retracted upwardly as the new endmost closure is advanced therebeneath and the mandrel is being rotated clockwise a one-eighth turn to advance the adhesive ribbon and the strip-closure units vacuum held thereon to properly position these for accomplishing the next step illustrated in FIG. 6.
Figures 16, 17:
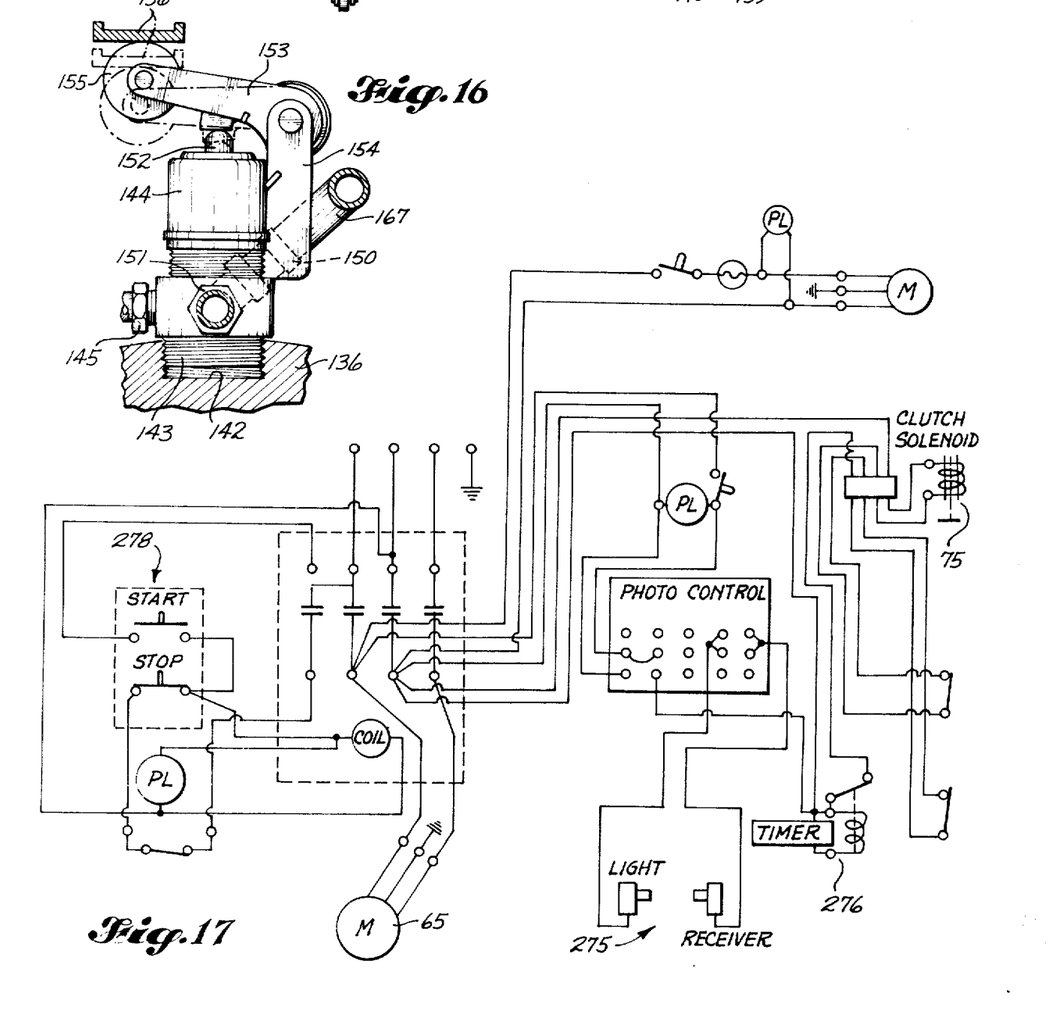
FIG. 16 is an enlarged detail view of one of the valves employed in the mechanism shown in FIG. 15.
FIG. 17 is a wiring diagram of the electrical circuitry of the invention.

Referring to the electrical wiring diagram shown in FIG. 17, and to FIGS. 1, 4 and 5, the machine 28 is seen to include a photoelectric control device 275 which is mounted on the frame of conveyor 20 so that the light beam of said device is projected crosswise of and just above the upper surface of the conveyor and at a point thereon in advance of the shaft 90 by a distance slightly less than the length of one of the bags 21. The device 275 is connected electrically through a timer 276 with the clutch solenoid 75. The timer 276 provides a rheostat permitting variation in the time period which occurs between the interruption of the photoelectric device 275 and the actuation of the clutch solenoid 75. This is for adjustment of the location lengthwise on each bag 21 that the adhesive tape-closure unit 30 is applied to said bag.

OPERATION

The machine 28 is preferably provided with its own vacuum pump (not shown) for constantly extracting air from pipe 125 to maintain a vacuum of about 10 inches in the vacuum chamber 138 of the vacuum manifold 136. The machine also includes an air compressor (not shown) which is connected to compressed air intake pipe 129 to maintain a constant air pressure in the chamber 139 of the manifold 137 of about 15 PSI. Before starting the machine 28, it is supplied with a full roll of adhesive tape 200 and a full roll of closure ribbon 225. To start the proper feeding of tape 200, it is drawn from the reel 199 over rollers 201 and 202 and then downwardly about the lowermost feed roller 216 and with the adhesive face of the tape adhering to the latter. The closure ribbon 225 is then fed downwardly underneath a guide 277 provided on the closure track 227 and along the latter until the endmost closure extends leftward from under the tip of the pick 230.

The main switch 278 may now be closed to start the machine 28. In the absence of any bag 21 on the conveyor 20 the machine will not automatically cycle. Cycling of the machine, in getting it started, can be accomplished by using the hand to interrupt the light beam of photoelectric device 275 to energize solenoid 75, thereby causing clutch 70 to make a single counter clockwise revolution. This similarly rotates the cam shaft 96 one complete revolution and, when the clutch 70 disengages, rotation of the cam shaft 96 stops. During this revolution, the machine 28 performs a single cycle with the end result of applying an adhesive tape-closure unit 30 by blasting this downwardly from the adhesive strip-closure assembly mandrel 228.

Each cycle begins and ends with the ram 241 in an elevated position and with the cam 106 positioned as shown in FIG. 5 and just about to rotate downwardly to depress the ram 241 from the position in which it is shown in FIGS. 11 and 12 to the position in which it is shown in FIG. 13.

At the start of a cycle, the cam 105 is positioned, as shown in broken lines in FIG. 5, at the completion of the feeding by the pick 230 of the closure ribbon 225 leftward in the track 227 so as to extend the endmost closure 31 directly under the ram 241 as shown in FIG. 12. At the start of a cycle, cam 105 will thus move downwardly to retract the pick 230 to its extreme rightward position in preparation for the next closure ribbon feeding operation.

Referring to FIG. 2, the cam 100 is in its dotted line position, shown in this view, at the end of each cycle so that, at the beginning of the next following cycle, cam 100 will depress bar arm 108 and the horizontal valve actuating plate 156 so as to depress the arm 153 of that particular one of the valves 144 which, for the present, is disposed in zenith or top position on the vacuum manifold 136.

The manner in which each valve 144 functions internally will now be described. The upwardly spring-biased stem 152, when not depressed, closes the internal port with which compressed air fitting 150 of the valve connects, and also causes vacuum fitting 145 and operational fitting 151 of that valve to be connected by the valve thereby imposing a vacuum on the chamber 181 in the assembly platform 170 in a diametrically opposite position on compressed air manifold 137, through the operational tube 184 connecting said valve to said platform. This vacuum in the eight platforms 170 sucks air inwardly through the grooves 188, 189 and 190 which holds the adhesive tape 200 securely to the periphery of assembly mandrel 228 with the adhesively coated face of said tape turned outwardly.

The only time the vacuum in one of the assembly platforms 170 is broken during the operation of machine 28 is when that particular platform has rotated with mandrel 228 into nadir (or directly down) position which brings its valve 144 to zenith (or straight up) position to incur actuation of that valve by cam 100 at the start of the following cycle. In that actuation, shown in full lines in FIG. 2 and in broken lines in FIG. 16, stem 152 is depressed thereby closing the vacuum fitting 145 of said valve and connecting the operational fitting 151 thereof to its compressed air fitting 150. Compressed air is thus instantly delivered to the chamber 181 of the down positioned assembly platform 170, replacing the vacuum therein with a surge of compressed air and blasting downwardly the reclosure unit 30 theretofore held tightly against said platform by the vacuum existing therein.

The machine 28 is preferably adjusted vertically by turning the crank handle 46 to leave a vertical space of one-half inch between the mandrel 228 and the bags 21 travelling therebeneath. The strip-closure unit 30 when blasted downward on a bag 21 is brought into proper close adherence therewith by the action of the air blast.

By momentarily releasing the latches 64 and shifting box structure 56 laterally, while thus freed, the assembly mandrel 228 may be aligned with a string of bags 21 as delivered onto conveyor 20 by a form-fill-seal machine (not shown). The timed relationship between the cyclic full single rotation of cam shaft 96 and the intermittent one-eighth cyclic rotation of shaft 90 is as follows. Output shaft 82 of geneva drive 78 doesn't turn during the first 215° of a cyclic single revolution of clutch 70. Shaft 82 then turns only 45° during the next 135° of rotation of clutch 70 and halts, while clutch 70 turns another 10° and then itself halts at the conclusion of a full single revolution. The cyclic rotation of cam shaft 96 is thus over seven-twelfths completed before the cyclic one-eighth revolution of shaft 90 starts. The latter movement does not interfere with the end results of cams 100, 105 and 106 turning which are completed in each machine cycle before geneva output shaft 82 starts its one-eighth revolution.

As shown in FIG. 10, the adhesively surfaced face of tape 200 tends to remain stuck to feed roller 216 but is pulled therefrom by upper roller 215, the higher peripheral speed of which prevents the tape sticking to it so that tape is fed onto the periphery of assembly mandrel 228 and held there by vacuum alone until the time comes to blast the final product onto a loaded bag 21. The tape feeder 203, being driven by the assembly mandrel 228, participates in the one-eighth intermittent cyclic revolutions of said mandrel to supply the latter with tape 200 as needed.

Referring to FIGS. 11, 12 and 13, there are four elements provided on the lower end of ram 241 which cooperate, in each down movement of the ram, to form and assemble an adhesive strip-closure unit 30 on the assembly platform 170 located at that time in zenith position in the assembly mandrel 228. These four elements function simultaneously as follows.

Cantilever blade 259 descends in line with the inverted V-shaped space separating the platform 170 at zenith and the next following platform so as to enter said space and sever adhesive tape 200 to cut an adhesive strip 32 therefrom co-extensive in length with the platform 170 in zenith position.

As the ram 241 is about half way down, the closure stripper plate 247 yieldably engages the closure 31 extending under the ram to bend this closure into a downwardly inclined position with one end resting on the adhesive upper surface of the tape 200 overlying the topmost platform 170. Engagement of the other end of said closure 31 by the overlying shearing edge of ram bottom face plate 250 shears said closure from the balance of closure ribbon 225, permitting said closure 31 to respond to the spring pressure imposed downwardly thereagainst by stripper plate 247 which applies said closure flat against the adhesively coated upper surface of the adhesive strip 32 just severed from adhesive tape 200 by cantilever blade 259.

Aligned with one of the vertical grooves 195 in the top platform 170, tape edge slitting blade 261 is lowered into said groove by the downward movement of ram 241 to cut slits 37 and 38 in opposite edges of said adhesive strip 32.

As ram 241 starts to return upwardly, the stripper plate 247 continues its downward pressure on the closure 31, just separated from closure ribbon 225, and pressed into face-to-face adhesion with the adhesively coated upper face of the newly formed adhesive strip 32. Said closure 31 and adhesive strip 32, thus fashioned into a reclosure unit 30, is assisted in remaining securely retained in place by the vacuum within the top platform 170 for timely discharge downwardly from said platform when the latter reaches its nadir position on the mandrel 228 during the fourth subsequent machine cycle.

What is claimed is:

1. In a machine for attaching stiff sheet plastic closures and the like flat against the respective exterior surfaces of a series of loaded bags, the combination of:
   means for conveying said series of bags along a given path and through a work station;
   means for advancing a flexible plastic tape, adhesive coated on one face only, along another given path converging toward said first mentioned path at said work station with the adhesive coated face of said tape turned toward a bag arriving at said station;
   means for cutting the leading end portion of said tape into a series of strips in timed relation with the advancing of said tape;
   means operating in timed relation with said cutting means to apply a closure flat against the adhesive coated face of each of said strips, leaving marginal adhesive coated tab means in said strip uncovered by said closure, each such closure and the strip adhering thereto comprising a closure-strip unit;

means for pressurally applying each such unit arriving at said work station to a loaded bag arriving at said station;

means to coordinate said tape advancing, tape cutting, closure applying and unit applying means with the approach of said bags to said station to uniformly relate each closure-strip unit to the bag to which it is applied; and means provided by said strip cutting means to form at least one slit in a side edge of each strip, said slit being located alongside the closure applied to said strip.

2. A machine as recited in claim 1 wherein said slit forming means cuts a pair of such slits in opposed relation in the side edges of each tape strip.

3. In a machine for attaching stiff sheet plastic closures and the like flat against the respective exteriors of a series of loaded bags travelling continuously along a given path upon a conveyor through a given work station, the combination of:

means for advancing a flexible plastic tape adhesive coated on one face only, along another given path converging toward said first mentioned path at said work station with the adhesive coated face of said tape turned toward a bag arriving on said conveyor at said work station;

means for cutting the leading end portion of said tape into a series of strips in timed relation with the advancing of said tape;

means operating in timed relation with said cutting means to apply a closure flat against the adhesive coated face of each of said strips, leaving marginal adhesive coated tab means in said strip uncovered by said closure, each such closure and the strip adhering thereto comprising a closure-strip unit;

means for pressurally applying each such unit arriving at said work station to a loaded bag arriving at said station on said conveyor;

said tape advancing means comprising a mandrel provided peripherally with an annular series of assembly platforms spaced endwise from each other and each having an internal chamber, air ports formed in each of said platforms connecting the chamber of that platform with the peripheral face of that platform;

means imposing a vacuum on said platform chambers causing said mandrel to vacuum grip an adhesive plastic tape trained onto said mandrel with the adhesive free face thereof turned toward the mandrel;

means to rotate said mandrel by intermittent movements in coordinated relation with the travel of loaded bags on said conveyor to advance said tape so gripped along said other given path;

said tape cutting and closure applying and closure-strip unit applying functions being performed during the intervals between said movements, said means for pressurally applying closure-strip units to bags comprising means for automatically replacing the vacuum in the chamber of each mandrel platform as it arrives at said work station with a burst of compressed air which blasts the closure-strip unit, just delivered by said platform to said station, into pressural flat adhering relation with a bag just arriving on said conveyor at said station, the platform from which a closure-strip unit is being delivered onto a bag on said conveyor being at its nadir or lowermost position on said mandrel, while another platform located at its zenith or uppermost position on said mandrel supports said tape during the cutting of another strip from said tape, the space between said uppermost platform and the next following platform receiving the cutting blade of the strip cutting means;

the closure applying means simultaneously applying a closure flat against and in adhering relation with the upwardly exposed adhesive coated face of the strip being cut from said tape;

means for receiving a coil of said closures integrally united in the form of a ribbon;

a coordinately vertically reciprocating ram being positioned directly above said mandrel for actuating both said tape cutting and closure applying means; and means for coordinately advancing said closure ribbon during each movement of said mandrel to position an endmost closure of said ribbon directly beneath said ram for separation of said closure from said ribbon by the next downward movement of said ram;

there being a spring biased closure stripper plate mounted on said ram for pressurally applying said closure to the strip cut from said tape by the same downward movement of said ram.

4. A machine as recited in claim 3 wherein strip slitting means is provided on aid ram to produce at least one slit in a side edge of a strip being cut off of said tape by each downward movement of said ram.

* * * * *